(12) United States Patent
Gerber et al.

(10) Patent No.: US 7,455,402 B2
(45) Date of Patent: Nov. 25, 2008

(54) FOLDABLE SPECTACLES, SPECTACLE CASE AND ARRANGEMENT OF FOLDABLE SPECTACLES IN THE FOLDABLE CASE

(75) Inventors: Hans Gerber, Minusio (CH); Luca Nizzola, Tenero (CH); Maurizio Combi, Verbania Biganzolo (IT)

(73) Assignee: Diamond SA, Losone (CH)

( * ) Notice: Subject to any disclaimer, the term of this patent is extended or adjusted under 35 U.S.C. 154(b) by 179 days.

(21) Appl. No.: 10/588,524

(22) PCT Filed: Jan. 11, 2005

(86) PCT No.: PCT/EP2005/000159

§ 371 (c)(1),
(2), (4) Date: Aug. 7, 2006

(87) PCT Pub. No.: WO2005/081047

PCT Pub. Date: Sep. 1, 2005

(65) Prior Publication Data

US 2008/0094568 A1    Apr. 24, 2008

(30) Foreign Application Priority Data

Feb. 17, 2004  (EP) .................................. 04405088

(51) Int. Cl.
*G02C 5/08* (2006.01)

(52) U.S. Cl. .......................... 351/63; 351/124; 351/153

(58) Field of Classification Search ................ 351/41, 351/63, 119, 121, 124, 153, 158; 206/5, 206/6

See application file for complete search history.

(56) References Cited

U.S. PATENT DOCUMENTS

| 4,720,186 | A | 1/1988 | Douillard |
| 4,840,476 | A | 6/1989 | Rooney |
| 5,896,185 | A | 4/1999 | Huang |
| 6,048,061 | A * | 4/2000 | Chiu .......................... 351/63 |
| 6,257,720 | B1 * | 7/2001 | Ozawa ....................... 351/128 |
| 6,315,408 | B1 | 11/2001 | Huang |

FOREIGN PATENT DOCUMENTS

DE           297 12 271 U1    10/1997

* cited by examiner

*Primary Examiner*—Huy K Mai
(74) *Attorney, Agent, or Firm*—Nath Law Group; Jerald L. Meyer; Jiaxiao Zhang

(57) ABSTRACT

The invention relates to foldable spectacles comprising two lenses (1a, 1b) which can be adjusted between a support position and a folded position and which are connected to each other by means of a nose piece (10). The nose piece (10) extends on a connecting axis (I) which is arranged on a plane of the spectacle lens and comprises a folding joint (15) which is used to fold the spectacles. The folding joint (15) can be rotated about a rotatable axis (m) which extends at an acute angle (β) to the connecting axis (1), such that the spectacle lenses (1a, 1b) are arranged on the same plane next to each other in a folded position after a 180° rotation.

18 Claims, 8 Drawing Sheets

FOLDABLE SPECTACLES, SPECTACLE CASE AND ARRANGEMENT OF FOLDABLE SPECTACLES IN THE FOLDABLE CASE

The present invention relates to foldable spectacles according to the preamble of claim 1, to a spectacle case according to the preamble of claim 1, and to an arrangement of the foldable spectacles in the spectacle case according to the preamble of claim 17.

A problem for someone wearing spectacles, in particular for someone who is long-sighted and needs reading glasses, is that the spectacles get lost, misplaced or forgotten on account of the fact that they are not always required. There is therefore a need for spectacles which are compact and, when not in use, can be stored in as small and flat a format as possible.

U.S. Pat. No. 4,840,476 describes foldable pince-nez or spectacles without sidepieces, in which two frameless spectacle lenses lying in one plane are connected by a U-shaped nose bridge, the spectacle lenses being connected to the nose bridge by means of a hinge pin inserted in a bore in each spectacle lens. These hinge pins also serve as hinges for folding the spectacles up. In the wearing position of the spectacles, the bores are located in a lower area of the spectacle lenses directed toward the nose. The arrangement of the hinges and of the associated spectacle lenses is such that the spectacle lenses can be moved from the wearing position to a compact storage position by a 90° rotation about a rotation axis which is perpendicular to the plane of the spectacle lenses and extends through the hinge, and the edges that form the upper edges of the spectacle lenses in the wearing position at least partially touch one another in the compact storage position. The spectacle lenses are thus always situated in the same plane in the wearing position and also in the compact storage position.

The spectacle lenses of the pince-nez in accordance with U.S. Pat. No. 4,840,476 have to be gripped with both hands when opening and closing them, so that there is a considerable risk of the viewing surface becoming smudged with fingerprints. In addition, spectacles that are placed in the wearing position onto a support surface generally have to be picked up from the support surface in order to fold them open or closed, or one spectacle lens at least has to be gripped sufficiently tightly to allow the other spectacle lens to be rotated.

U.S. Pat. No. 4,720,186 describes foldable spectacles with framed spectacle lenses and with sidepieces present at both ends. The nosepiece, which connects the framed spectacle lenses to one another, has a centrally arranged hinge that allows the spectacles to be folded up from the wearing position by pivoting the spectacle lenses upward through 90° about an axis perpendicular to the plane of the spectacle lenses. Those edges of the framed spectacle lenses that form the upper edges in the wearing position touch one another at least partially in the folded-up storage position. The spectacle lenses are thus always situated in the same plane in the wearing position and also in the folded-up storage position. The sidepieces are connected to the framed spectacle lenses without a hinge, but they have a bendable intermediate piece. The foldable spectacles according to U.S. Pat. No. 4,720,186 are designed such that the framed spectacle lenses fit into a watch case in the folded-up state, the sidepieces protruding freely from the watch case and being guided along the outside of the watch strap, and the watch strap also being provided with securing means for the ends of the sidepieces. Such spectacles are therefore not suitable for storage in a flat housing.

It is an object of the present invention to provide foldable spectacles which can be accommodated in a compact format in a spectacle case which is as flat as possible, without those edges of the spectacle lenses that form the upper edges in the wearing position coming to touch one another in the compact storage position. To avoid as far as possible any smudging of the viewing surfaces of the foldable spectacles, a further object is to provide foldable spectacles in which the two spectacle lenses can be folded open and shut with the fewest possible points of contact of finger prints.

According to the invention, this object is achieved by foldable spectacles having the features of claim 1.

Compared to the spectacles known from the prior art, the foldable spectacles according to the present invention have the advantage that foldable spectacles placed on a support surface in the wearing position only have to be held via one spectacle lens, or its frame, and can then be folded, while the other spectacle lens is able to remain in the same position on the support surface, and keeping the spectacle lens in its position on the support surface does not require any force to be applied, thus avoiding fingerprints.

Each spectacle lens has a concentric longitudinal axis la, lb and, perpendicular to this, a transverse axis ta, tb. The concentric longitudinal and transverse axes of a spectacle lens divide its viewing surface into four surface regions of equal size. The plane through the concentric longitudinal and transverse axes of a spectacle lens forms the plane of the corresponding spectacle lens. The concentric transverse axes ta, tb of both spectacle lenses usually always lie parallel to one another in the opened state of the spectacles. The concentric longitudinal axes la, lb of both spectacle lenses can lie on a straight line in the opened state of the spectacles, or they can enclose an angle deviating only slightly from a 180° angle. With the spectacles in the opened state, the two concentric longitudinal axes la, lb of the spectacle lenses expediently enclose an angle of 170° to 180°, preferably of 176° to 180°, or they are located on a straight line. Therefore, in the text that follows, where the expression "plane of a spectacle lens" is used in connection with the opened spectacles, i.e. the spectacles in the wearing position, this always also includes the plane through both spectacle lenses, such a plane often representing a slightly curved surface.

In the wearing position of the foldable spectacles, each spectacle lens has an outer spectacle lens surface and an inner spectacle lens surface, as seen from the point of view of the person wearing the spectacles. After a rotation folding, after which both spectacle lenses again come to lie in the same plane, an outer spectacle lens surface of one spectacle lens and an inner spectacle lens surface of the other spectacle lens come to lie in the same plane. In the folded state, the two concentric longitudinal axes la, lb of the spectacle lenses form an angle of (180°-2 β) with one another. The connecting axis l' of the two spectacle lenses extends in the plane of the spectacle lenses and can coincide with a concentric longitudinal axis of the nosepiece, this particularly being the case when the nosepiece and the folding joint are designed symmetrically in relation to the connecting axis l'.

The foldable spectacles according to the invention can comprise framed or frameless spectacle lenses. When using frameless spectacle lenses, the nosepiece usually contains two nosepiece pins which are inserted into each spectacle lens and are connected to one another via the folding joint. When using framed spectacle lenses, the nosepiece usually forms part of the spectacle frame, and the nosepiece contains the folding joint according to the invention.

In a preferred embodiment of the foldable spectacles, the folding joint comprises two folding-joint parts which each have a hinge surface. In the assembled state of the foldable spectacles, the hinge surfaces of the two folding-joint parts bear on one another. The rotation axis m is then always perpendicular to the hinge surfaces. Accordingly, the surface normals on the hinge surfaces also coincide with the rotation axis m. The two folding-joint parts are connected releasably to one another by a securing means, for example by a screw connection.

The connection between the two folding-joint parts is preferably pretensioned with a spring element in the direction of the rotation axis such that, on the one hand, a rotation of the two spectacle lenses about the rotation axis m is possible, and, on the other hand, the two spectacle lenses in the wearing position and folded position are secured sufficiently to one another to avoid undesired rotation.

The hinge surfaces of the folding joint can also preferably have a frustoconical configuration with a trapezoidal cross section, in such a way that lateral fixing of the two-folding joint parts is ensured, so that the securing means for the two folding-joint parts only has to take up the forces in the axial direction of the folding joint.

The acute angle β between the connecting axis l' and the rotation axis m is, for example, between 30° and 60°, and preferably between 40° and 50°.

The spectacles can be designed as pince-nez without sidepieces. However, a design with preferably two sidepieces is preferred. The sidepieces can be designed in one part or in several parts, a sidepiece made up of several parts usually having a hinge between the individual parts of the sidepiece. The sidepieces can be made of a dimensionally stable or bendable material. However, sidepieces consisting of one part are in particular made bendable at least in some sections. The sidepieces can be secured releasably on the spectacle lens or on the frame of the spectacle lens, for example by means of screws, or the sidepiece can also be an integral part of a one-piece spectacle frame. The sidepiece can also be secured on the spectacle lens or on the frame of the spectacle lens via a sidepiece hinge.

The sidepieces are preferably secured, by means of a sidepiece hinge, on a sidepiece mount fixed on the spectacle lens or on the frame of the spectacle lens. In the text below, the expression "spectacle lens" always includes the two embodiment variants, namely a spectacle lens with spectacle frame and a spectacle lens without a spectacle frame.

In a preferred embodiment, the sidepieces are secured, by means of a sidepiece hinge, on a sidepiece mount fixed on the spectacle lens, in such a way that the sidepiece can be rotated from a wearing position, in which it lies substantially perpendicular to the plane of the spectacle lenses (in particular from a plane which is perpendicular to the plane of the spectacle lenses and extends for example centrally through the two sidepiece hinges), completely into the plane of the adjoining spectacle lens. The term "completely" means in this context that the sidepiece comes to lie alongside the spectacle lens; this is in contrast to a sidepiece which, after being folded together, comes to lie on a spectacle lens, i.e. in a plane parallel to the plane of the spectacle lens.

In another preferred embodiment of the foldable spectacles, the sidepiece mount is secured at one end on the spectacle lens, the other end of the sidepiece mount having a rotary bushing, and that end of the sidepiece oriented toward the sidepiece hinge preferably having a fork-shaped projection with two tabs which are spaced apart and which have recesses, for example bores, for receiving a rotary pin, the one end of the sidepiece mount with the rotary bushing lying between the two tabs of the fork-shaped projection, and the rotary bushing and the bores of the fork-shaped projection having a continuous rotary pin so that the sidepiece is mounted rotatably on the sidepiece mount. The design of the sidepiece hinge according to the invention, however, also includes the reverse hinge configuration in which the disk-shaped projection with the rotary bushing is part of the sidepiece, and the fork-shaped projection is part of the sidepiece mount.

That end of the sidepiece mount containing the rotary bushing is also preferably designed as a disk-shaped locking element with a peripheral surface extending parallel to the rotation axis through the rotary bushing. The locking element can involve a leaf-shaped or disk-shaped projection of the sidepiece mount which, in a plan view from the direction of the rotation axis passing through the rotary bushing, has a partially circular or polygonal cross section, for example. The peripheral surface preferably has two trough-like depressions for receiving a resilient catch element, in particular a pin tip belonging to a pin which emerges from that end of the sidepiece directed toward the sidepiece hinge and which is connected to the sidepiece via a pressure element. The pressure element can, for example, be a compression spring or a pneumatic pressure element. The trough-like depressions can, for example, be groove-like depressions which extend in the direction of the rotation axis of the sidepiece hinge and which, for example, have a cross section of semicircular configuration. The two trough-like depressions are preferably arranged at an angle of approximately 90° relative to the rotation axis extending through the rotary bushing, in such a way that one trough-like depression serves for releasably locking the sidepiece in the wearing position of the spectacles, and the other trough-like depression serves for releasably locking the sidepiece when it has been rotated into the plane of the adjoining spectacle lens.

In another preferred embodiment of the foldable spectacles, the sidepieces are made in two parts, each sidepiece being divided into a temple sidepiece, bearing on the sidepiece hinge, and an ear sidepiece, and the two parts of the sidepiece are connected to one another by an intermediate hinge. The intermediate hinge is preferably designed such that it permits, on the one hand, a deployed, releasably locked configuration of the sidepiece in which the temple sidepiece and at least one area of the ear sidepiece adjacent to the intermediate hinge lie on the same axis, and, on the other hand, a position in which the ear sidepiece is releasably locked approximately at a right angle with respect to the deployed configuration of the sidepiece in the wearing position of the spectacles. Such a division of the sidepiece permits a more compact storage configuration of the foldable spectacles.

The intermediate hinge preferably has a catch device for releasably locking the ear sidepiece in the deployed position or angled position. This catch device can be designed such that the end of the temple sidepiece directed toward the ear sidepiece has a disk-shaped projection with a rotary bushing, and the end of the ear sidepiece directed toward the temple sidepiece has a fork-shaped projection with two tabs which are spaced apart from one another and have recesses, for example bores, for receiving a rotary pin. The disk-shaped projection lies between the two tabs of the fork-shaped projection, and the rotary bushing and the bores of the fork-shaped projection have a continuous rotary pin so that the ear sidepiece is mounted rotatably on the temple sidepiece. The design of the intermediate hinge according to the invention, however, also includes the reverse hinge configuration in which the disk-shaped projection with the rotary bushing is a projection of the ear sidepiece, and the fork-shaped projection is part of the temple sidepiece.

The locking element can involve a leaf-shaped or disk-shaped projection of the temple sidepiece which, in a plan view from the direction of the rotation axis passing through the rotary bushing, has a partially circular or polygonal cross section, for example. The peripheral surface, i.e. the surface parallel to the rotation axis of the intermediate hinge and running round the locking element, preferably has two trough-like depressions for receiving a pin tip belonging to a pin which emerges from that end of the ear sidepiece directed toward the intermediate hinge and which is connected to the ear sidepiece via a pressure element. The pressure element can, for example, be a compression spring or a pneumatic pressure element. The trough-like depressions can, for example, be groove-like depressions which extend parallel to the rotation axis of the intermediate hinge and which, for example, have a cross section of semicircular configuration. The trough-like depressions are preferably arranged at an angle of approximately 90° relative to the rotation axis extending through the rotary bushing, in such a way that one trough-like depression serves for releasably locking the sidepiece in the deployed wearing position, and the other trough-like depression serves for releasably locking the angled sidepiece.

In another preferred embodiment of the foldable spectacles, the sidepiece is designed as a telescope. Here, one part of the sidepiece is expediently tubular, and another part is designed as a telescope insert which can be pushed into the tubular part. The cross section of the two telescope parts can, for example, be round, oval, polygonal or rectangular. By forming the sidepiece as a telescope, the sidepiece can be lengthened or shortened.

It is particularly preferred for the temple sidepiece to be designed as a telescope. The temple sidepiece then has a preferably cylindrical hollow space which, at least in an end area directed toward the ear sidepiece, has a polygonal or substantially rectangular cross section and receives a telescope insert with a correspondingly polygonal or substantially rectangular cross section. One end of the telescope insert expediently comprises the projection required for the intermediate hinge. The hollow cylindrical end area of the temple sidepiece, directed toward the ear sidepiece and having a polygonal or rectangular inner cross section, is here referred to as a telescope guide element. Arranged between the other end of the telescope insert and the corresponding end of the cylindrical hollow space, there is preferably a telescope spring which presses the telescope insert out of the cylindrical hollow space.

The telescope insert is designed with a polygonal or substantially rectangular cross section so that, in interaction with the telescope guide element, it is possible to adopt a predefined position of rotation of the telescope insert relative to the longitudinal axis of the temple sidepiece, and thus, in interaction with the intermediate hinge, it is possible to adopt a predefined position of rotation of the ear sidepiece.

In a preferred embodiment, in an area directly in front of the projection required for the intermediate hinge, the telescope insert is twisted in cross section relative to its longitudinal axis. This has the effect that the telescope insert is rotatable about its longitudinal axis in the telescope guide element. The area of the telescope insert directly in front of the projection required for the intermediate hinge can be round or polygonal, for example, but its cross section is in particular smaller than the remaining cross section of the telescope insert. This permits a rotation of the telescope insert, introduced almost completely into the cylindrical hollow space, and therefore of the ear sidepiece relative to the tubular temple sidepiece.

In another preferred embodiment, the telescope insert has a twisted longitudinal profile so that, when the telescope insert is ejected by the telescope spring from the rotary element from the compact, retracted position to the wearing position, the telescope insert rotates about a predefined angle, for example 90°, around the concentric longitudinal axis of the temple sidepiece. The inner profile of the rotary element is here adapted to the twisted longitudinal profile of the telescope insert.

The object in respect of the spectacle case concerns the provision of as flat and compact as possible a housing for storage of foldable spectacles, in particular of foldable spectacles with sidepieces mounted on the spectacle lenses. A further object lies in avoiding smudging the spectacle lenses when fitting the spectacles into and removing them from the spectacle case, or when folding the spectacles shut or opening them out.

According to the invention, this object is achieved by a spectacle case having the features of claim 13.

The spectacle case can, for example, comprise a dimensionally stable base and a lid, the base and the lid each having two long sides and two short sides. The base and the lid are connected to one another via a hinge on one long side. The base and the lid are preferably structurally similar parts with the same function. Accordingly, in the description below, the two expressions are used interchangeably.

In a preferred embodiment, the housing parts each have a peripheral collar, so that a flat, box-like spectacle case is formed which preferably has a rectangular interior. On the hinge side, the collars of the housing parts can each have a recess for receiving the folding joint of the foldable spectacles.

The peripheral collar forms a peripheral edge, in particular comprising a recess for receiving the folding joint and, if appropriate, also recesses for partially receiving the pad bridges. The peripheral collar preferably has a square, rectangular or trapezoidal cross section.

In a preferred embodiment of the spectacle case, the peripheral collar has, at least in some areas, a hollow edge which is open toward the interior of the case and which partially receives the sidepiece, the shape of the hollow edge being chosen such that some areas of the cross section of the sidepiece can be received with an exact fit.

If the temple sidepiece has a substantially round cross section, the hollow edge on that side of the case remote from the hinge, for example, is designed with a semicircular cross section, so that, for example, half the cross section of the temple sidepiece can be accommodated in the hollow edge, thereby permitting a space-saving arrangement of the temple sidepiece and additionally also ensuring secure fixing of the temple sidepiece in the spectacle case.

In another preferred embodiment of the spectacle case, one housing part has an opening into which a magnifying glass is fitted. The magnifying glass is advantageously fitted into a housing-part opening which is located exactly above a spectacle lens. In this way, the magnification provided by the magnifying glass can be intensified by the spectacle lens inserted into the spectacle case. In this way, the spectacle case can be used as a magnifying glass, at least in the opened state, and irrespective of whether spectacles are or are not present in the spectacle case.

It is also preferred that, when the spectacle case is folded shut, the housing part lying opposite the opening for the magnifying glass has a corresponding window opening arranged in mirror symmetry. The opening lying opposite the magnifying glass may or may not be covered by the spectacle lens on the inside of the spectacle case. This allows the spectacle case to be used as a magnifying glass, irrespective of whether the spectacle case is open or shut, or of whether foldable spectacles are or are not present therein.

In a further embodiment of the spectacle case, at least the housing part lying opposite the magnifying glass when the spectacle case is folded shut is made of a transparent material. It is thus possible to dispense with an opening opposite the magnifying glass, while still ensuring that the spectacle case can be used as a magnifying glass in the opened and shut states; and this irrespective of whether spectacles are or are not present in the spectacle case.

The dimensions of the spectacle case are preferably such that the height of the preferably square interior of the spectacle case, when the latter is shut, corresponds substantially to the thickness of a spectacle lens. In spectacle cases for storage of foldable spectacles with sidepieces, the length of the interior is preferably defined principally by the length of the temple sidepieces, and the width of the interior is defined principally by the length of the ear sidepieces, the length of the ear sidepieces expediently being chosen as a function of the length of the spectacle lens.

The object in respect of the arrangement of the foldable spectacles in the spectacle case concerns being able to insert the foldable spectacles in as flat and compact as possible a manner into the spectacle case. A further object lies in ensuring that the spectacles according to the invention can be opened and shut by opening and shutting the spectacle case.

According to the invention, this object is achieved by an arrangement having the features of claim 17.

In the arrangement according to the invention, each housing part receives a spectacle lens, and the spectacle lenses are secured releasably on the housing parts. The folding joint is arranged in such a way that its rotation axis coincides with the hinge axis of the spectacle case. If appropriate, the folding joint is fitted in corresponding recesses in the peripheral collars of the housing parts.

The arrangement according to the present invention means that the foldable spectacles secured in the spectacle case can be opened out and closed by opening or closing the spectacle case. In the folded state, the two spectacle lenses come to lie alongside one another in the same plane. The longitudinal axes la, lb of the two spectacle lenses enclose an angle of $(180°-2\beta)$ in the folded state.

In a further preferred embodiment of the arrangement of foldable spectacles with at least one sidepiece in the spectacle case, the temple sidepieces bear on the long sides of the housing parts opposite the hinge, and the ear sidepieces bear on the shorter sides in such a way that the two spectacle lenses and the sidepieces are arranged in a Z shape when the spectacle case is opened.

The invention is explained in more detail and by way of example with reference to FIGS. 1 to 11, in which:

FIG. 1 shows a perspective view of foldable spectacles with two spectacle lenses, where, from the point of view of the person wearing the spectacles, the right-hand spectacle lens is designated by 1a and the left-hand spectacle lens by 1b.

Figure 1:
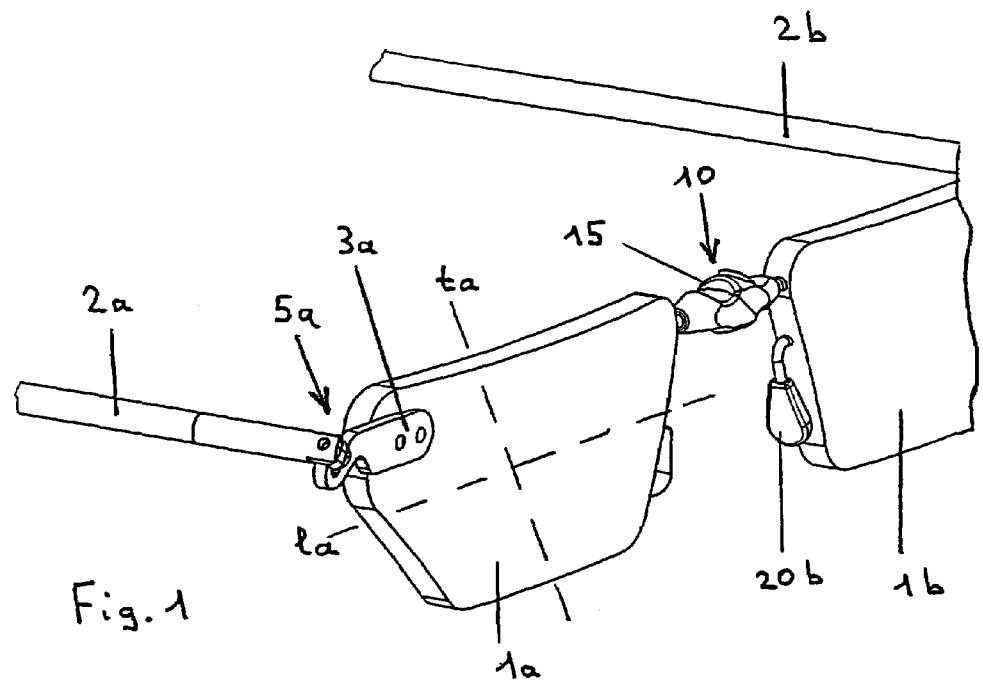
FIG. 1 shows a perspective view of foldable spectacles.

In the following description of the figures, the reference labels with the added letter "a" always relate to the right-hand side in relation to the fold axis of the folding joint, as seen from the point of view of the person wearing the spectacles, and the reference labels with the added letter "b" always refer to the left-hand side in relation to the fold axis, as seen from the point of view of the person wearing the spectacles. The two sides of the foldable spectacles are preferably of symmetrical construction, so that the figures generally show only the reference labels for one side. The nosepiece 10 with the centrally arranged folding joint 15 is located between the spectacle lenses 1a and 1b. The pad bridges 20a and 20b can also be seen in the nose space between the spectacle lenses 1a and 1b. The longitudinal axis la and the transverse axis ta are also indicated for the right-hand spectacle lens 1a, as seen from the point of view of the person wearing the spectacles. FIG. 1 also shows the sidepieces 2a and 2b secured on the spectacle lenses 1a and 1b. The sidepieces 2a and 2b are connected to the sidepiece mounts 3a, 3b via the sidepiece hinges 5a, 5b, the sidepiece mounts 3a, 3b being secured directly on the spectacle lenses. The sidepiece mounts 3a, 3b can be secured on the spectacle lenses 1a, 1b by means of screws or rivets (not shown).

Figure 2:
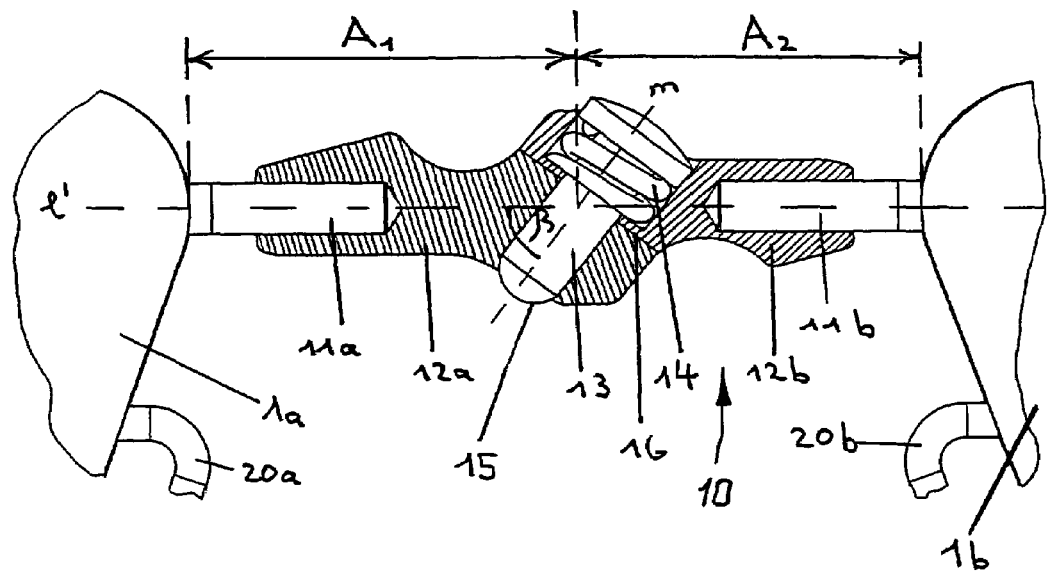
FIG. 2 shows a cross section through the nosepiece with the folding joint.

FIG. 2 shows a cross section through the nosepiece 10 with the folding joint 15. The nosepiece 10 consists of two nosepiece pins 11a, 11b fitted into the spectacle lenses 1a, 1b, and of folding-joint parts 12a, 12b lying between these nosepiece pins. The folding-joint parts 12a, 12b each have a hinge surface 16, and these hinge surfaces 16 come to lie on one another. The two folding-joint parts 12a, 12b are connected to one another by means of a folding-joint screw 13. The bore in the folding-joint part 12b is in this case countersunk such that the head of the folding-joint screw can be introduced partially into the countersunk hole. Also provided in the countersunk hole there is a folding-joint spring 14 which allows the two folding-joint parts 12a, 12b to be secured in rotation. The surface normal to the hinge surface 16 forms the rotation axis m. A concentric longitudinal axis l' extends through the two nosepiece pins 11a, 11b and the two folding-joint parts 12a, 12b. This concentric longitudinal axis l' forms an acute angle $\beta$ with the rotation axis m. FIG. 2 shows the foldable spectacles in the opened state, that is to say in the wearing position of the spectacles. The point of intersection of the rotation axis m with the concentric longitudinal axis l' bisects the nosepiece 10, such that the nosepiece 10 is divided into two sections $A_1$ and $A_2$.

Figure 3:
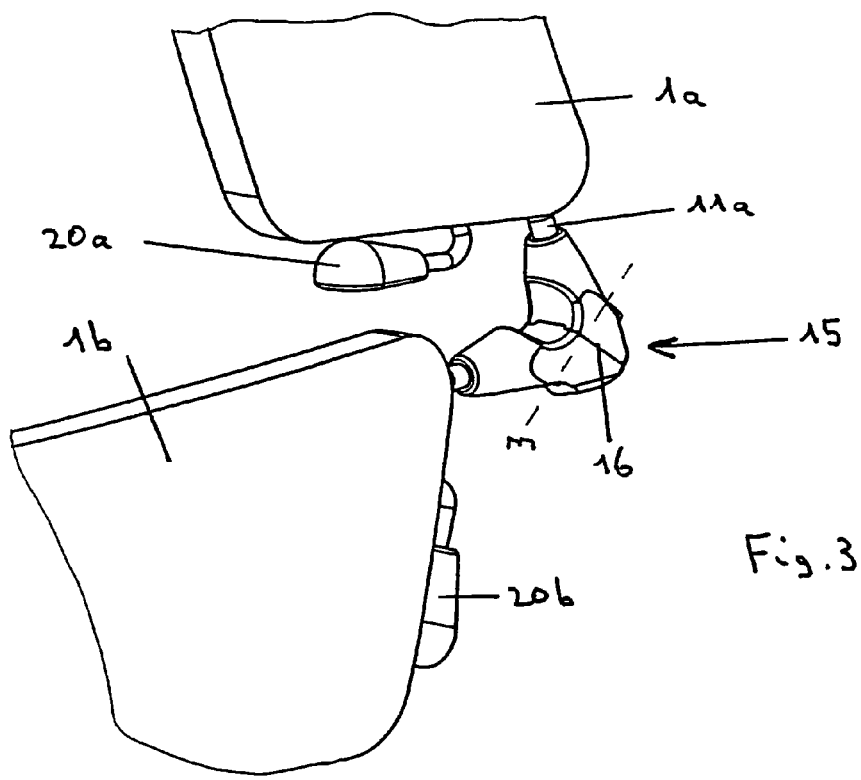
FIG. 3 shows a perspective view of foldable spectacles in the folded-up state.

FIG. 3 shows a perspective view of foldable spectacles in the folded-up state. The spectacle lenses 1a, 1b have been turned 180° about the rotation axis m. The actual rotation takes place on the hinge surface 16 of the folding joint 15.

Figures 4A, 4B:
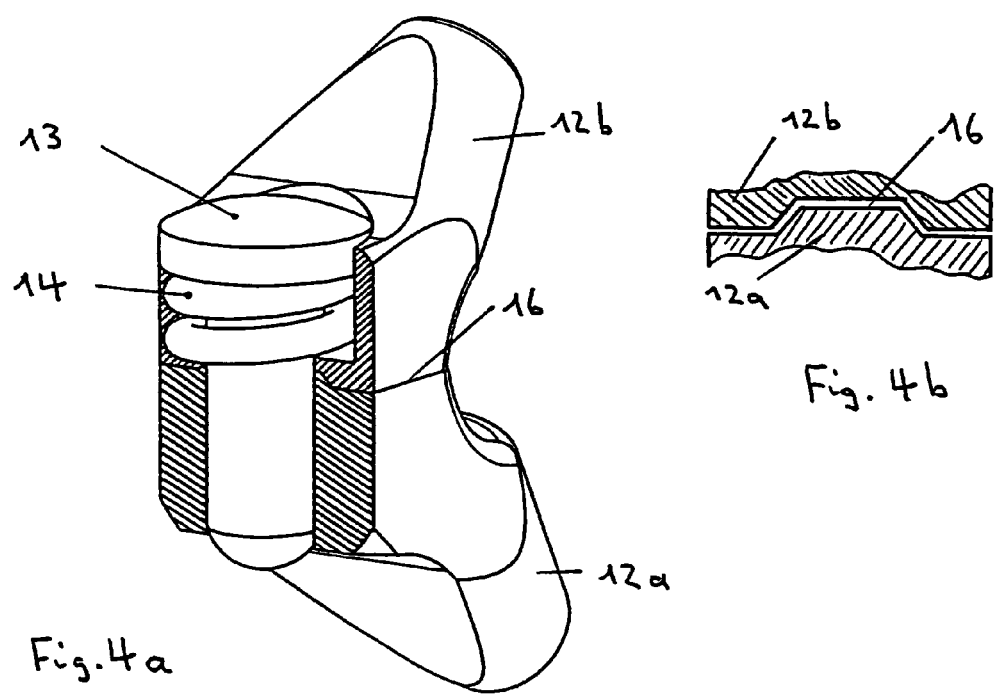
FIG. 4a shows a perspective view of a section through the folding joint.
FIG. 4b shows a cross section through an illustrative embodiment of two hinge surfaces of the folding hinge that lie on one another.

FIG. 4a shows a perspective view of a cross section through the folding joint 15. Here, the folding joint 15 is shown in the folded-up state. The folding-joint parts 12a, 12b are connected to one another by means of a folding-joint screw 13. The bore for receiving the folding-joint screw 13 is countersunk on the side of the folding-joint part 12b. This countersunk bore also contains a folding-joint spring 14 which is secured at one end by the countersink and at the other end by the head of the folding-joint screw 13.

FIG. 4b shows a specific design of the hinge surface 16. Here, the hinge surfaces 16 of the folding-joint parts 12a, 12b are of trapezoidal cross section. Such a design of the hinge surfaces 16 permits lateral fixing of the folding-joint parts 12a, 12b, so that the folding-joint screw 13 only has to take up the forces in the axial direction of the screw connection.

Figure 5:
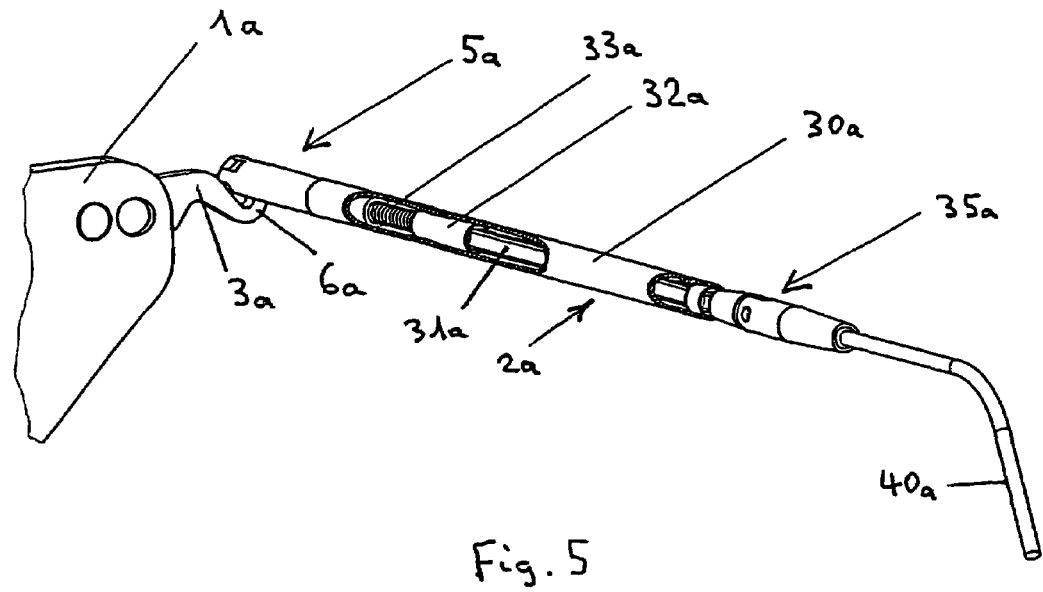
FIG. 5 shows a perspective view of a sidepiece secured on a spectacle lens.

FIG. 5 shows a perspective view of a sidepiece 2a secured on a spectacle lens 1a. Here, the sidepiece 2a is connected to the sidepiece mount 3a via the sidepiece hinge 5a. At one end, the sidepiece mount 3a has a leaf-shaped projection which is secured on the spectacle lens 1a by means of screws or rivets. A hook-shaped projection 6a is provided at the other end of the sidepiece mount 3a. The sidepiece 2a is divided into two parts, namely the temple sidepiece 30a and the ear sidepiece 40a, the two parts being connected to one another via the intermediate hinge 35a. The temple sidepiece 30a is of substantially tubular design and has a cylindrical hollow space. This hollow space receives a telescope insert 31a. A telescope spring 33a is situated between the telescope insert 31a and that end of the cylindrical hollow space toward the sidepiece hinge. Moreover, a cylindrical guide piece 32a, which is freely movable in the tubular temple sidepiece 30a, is arranged between the telescope spring 33a and the telescope insert 31a.

Figure 6:
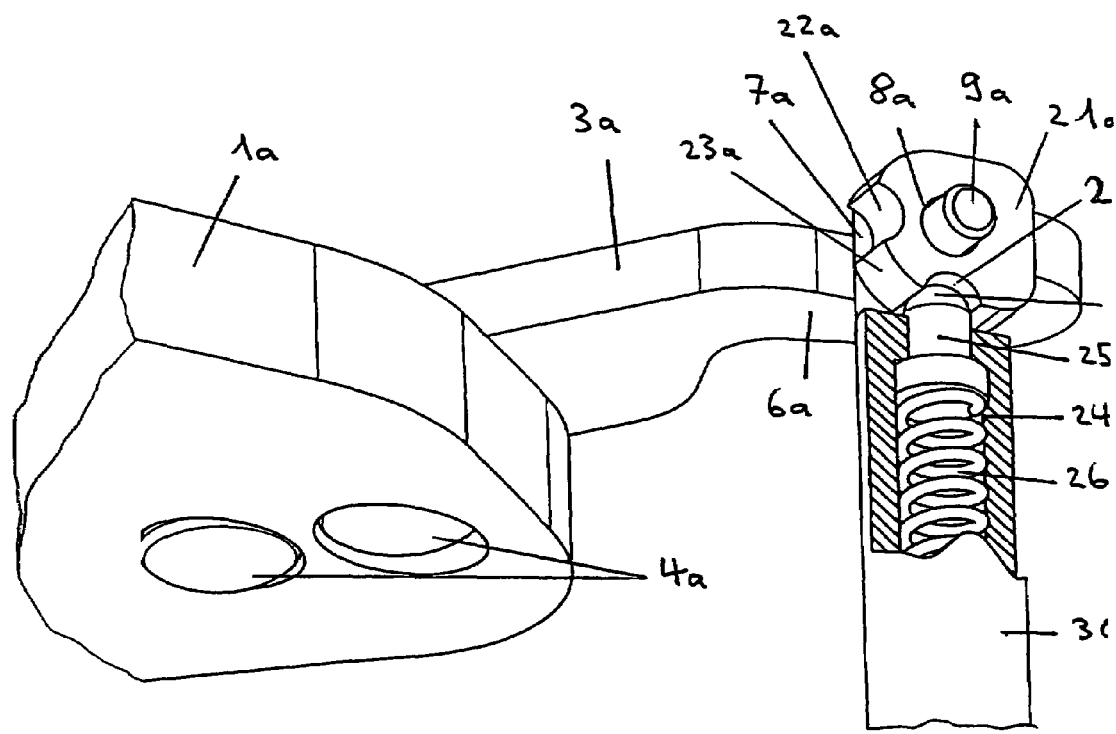
FIG. 6 shows a perspective view of a sidepiece hinge.

FIG. 6 shows a perspective view of a sidepiece hinge. The spectacle lens 1a has two bores 4a for securing the sidepiece mount 3a. The free end of the sidepiece mount 3a is designed as a hook-shaped projection 6a. The free end of the hook-shaped projection 6a is designed as a locking element 21a and contains a rotary bushing 8a for receiving a rotary pin 9a. The end of the temple sidepiece 30a toward the sidepiece hinge is designed with a fork shape, the fork-shaped projection 7a having two tabs arranged at a distance from one another. In the figure, however, only one tab of the fork-shaped projection 7a can be seen. The locking element 21a lies between the two tabs of the fork-shaped projection 7a. The two tabs of the fork-shaped projection 7a have bores, so that a rotary pin 9a can be pushed through these bores and through the rotary bushing 8a of the locking element 21a. The temple sidepiece 30a is in this way freely rotatable about the rotation axis of the sidepiece hinge 5a. The locking element 21a has two groove-shaped recesses 22a which are arranged at an angle of 90° relative to the rotation axis of the sidepiece hinge. That end of the temple sidepiece 30a toward the sidepiece hinge has an undercut bore. A cylindrical screw-shaped pin 25a is located in this undercut bore. The undercut bore also contains a compression spring 26a, which presses the cylindrical screw-shaped shaped pin 25a outward. The cylindrical screw-shaped pin 25a has a pin tip 27a which fits into the groove-shaped recess 22a. The interaction of the groove-shaped recess 22a and the pin tip 27a permits releasable locking of the temple sidepiece 30a. The groove-shaped recesses 22a are arranged on the locking element 21a in such a way that it is possible to obtain, on the one hand, a lockable position of the temple sidepiece 30a in the plane of the spectacle lens 1a and, on the other hand, a lockable wearing position in a plane perpendicular to the spectacle lens plane.

Figure 7:
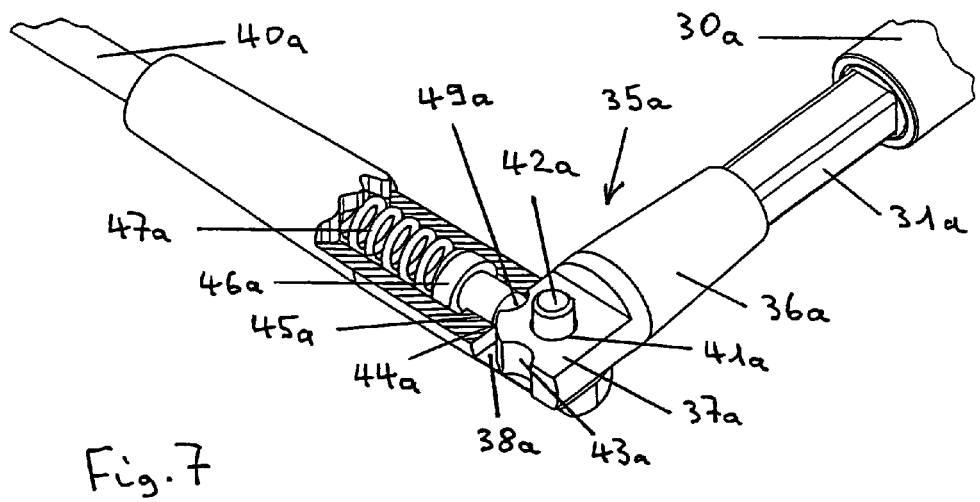
FIG. 7 shows a perspective view of an intermediate hinge.

FIG. 7 shows a perspective view of an intermediate hinge 35a. The intermediate hinge 35a connects the temple sidepiece 30a to the ear sidepiece 40a. A partially ejected telescope insert 31a protrudes from the temple sidepiece 30a. The cross section of the telescope insert 31a is substantially square, the corners being beveled. A joint sleeve 36a is located at the free end of the telescope insert 31a. The joint sleeve 36a has a leaf-shaped projection in the form of a locking element 37a. The locking element 37a is of substantially the same configuration as the locking element 21a described in FIG. 6 and in particular has a bearing bushing 41a. The end of the ear sidepiece 40a toward the intermediate hinge is designed as a fork-shaped projection 38a with two tabs arranged at a distance from one another, only one tab being visible in FIG. 7. The locking element 37a comes to lie between the two tabs of the fork-shaped projection 38a. The two tabs of the fork-shaped projection 38a each have a bore, so that a rotary journal designed as rotary pin 42a can be fitted between these bores and the bearing bushing 41a of the locking element 37a. In this way, the ear sidepiece 40a is freely rotatable relative to the temple sidepiece 30a about the axis through the rotary bushing 41a. The fork-shaped projection 38a of the ear sidepiece 40a has, at its free end, an undercut bore which receives a cylindrical pin 46a. The undercut bore also contains a compression spring 47a which presses the cylindrical screw-shaped pin 46a outward. The pin tip 49a of the cylindrical screw-shaped pin 46a is located in a groove-shaped recess 43a. The locking element 37a has two groove-shaped recesses 43a on its surface parallel to the rotation axis of the intermediate hinge 35a, that is to say the so-called peripheral surface 44a. The groove-shaped recesses 43a are arranged in such a way that it is possible to obtain, on the one hand, a deployed sidepiece position in which the concentric longitudinal axis of the ear sidepiece 40a and the concentric longitudinal axis of the temple sidepiece 30a coincide, and, on the other hand, also a lockable position which is at an angle of approximately 90° to the deployed position.

Figure 8:
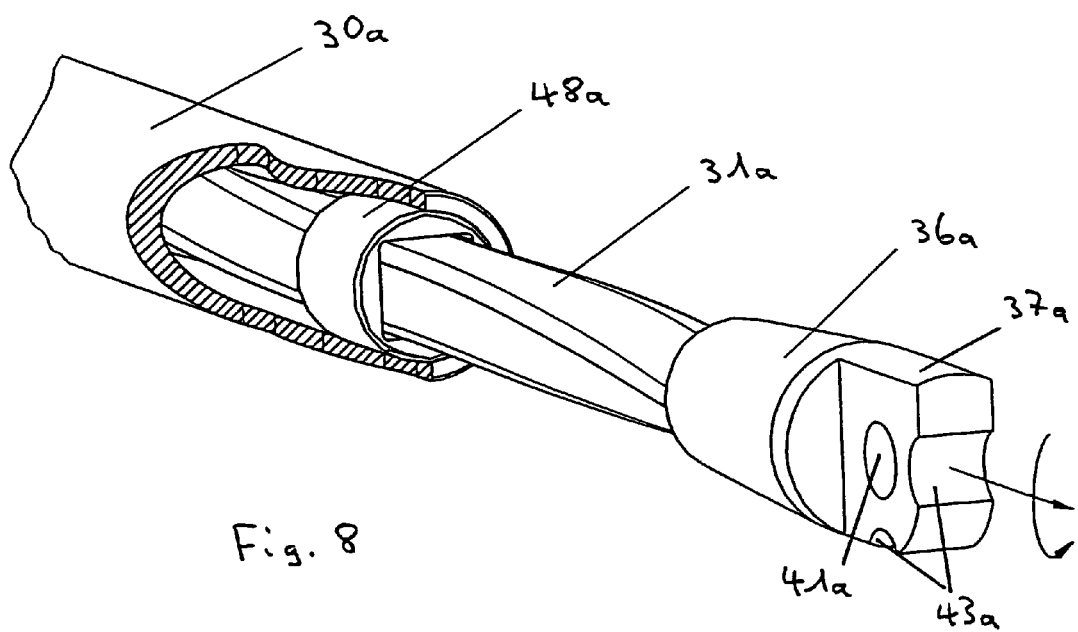
FIG. 8 shows a perspective view of a telescope insert.

FIG. 8 shows a perspective view of a specially designed telescope insert 31a. The temple sidepiece 30a is of tubular design and, at its free end, contains a rotary element 48a. The rotary element 48a is designed as a hollow cylinder shape, its cylindrical hollow interior having a substantially square cross section. The telescope insert 31a likewise has an approximately square cross section with beveled edges. A joint sleeve 36a is secured at the free end of the telescope insert 31a. The joint sleeve 36a has a leaf-shaped projection in the form of a locking element 37a. The locking element 37a has a bearing bushing 41a and two groove-shaped recesses 43a. The special design of the telescope insert 31a involves the twisted longitudinal profile. The interaction of the twisted longitudinal profile with the rotary element 48a means that, when the telescope insert 31a is ejected by the telescope spring from the compact, retracted position into the wearing position, a rotation of the locking element 37a and thus also of the ear sidepiece 40a takes place about a predefined angle, for example of 90°, around the concentric longitudinal axis of the temple sidepiece 30a.

Figure 9:
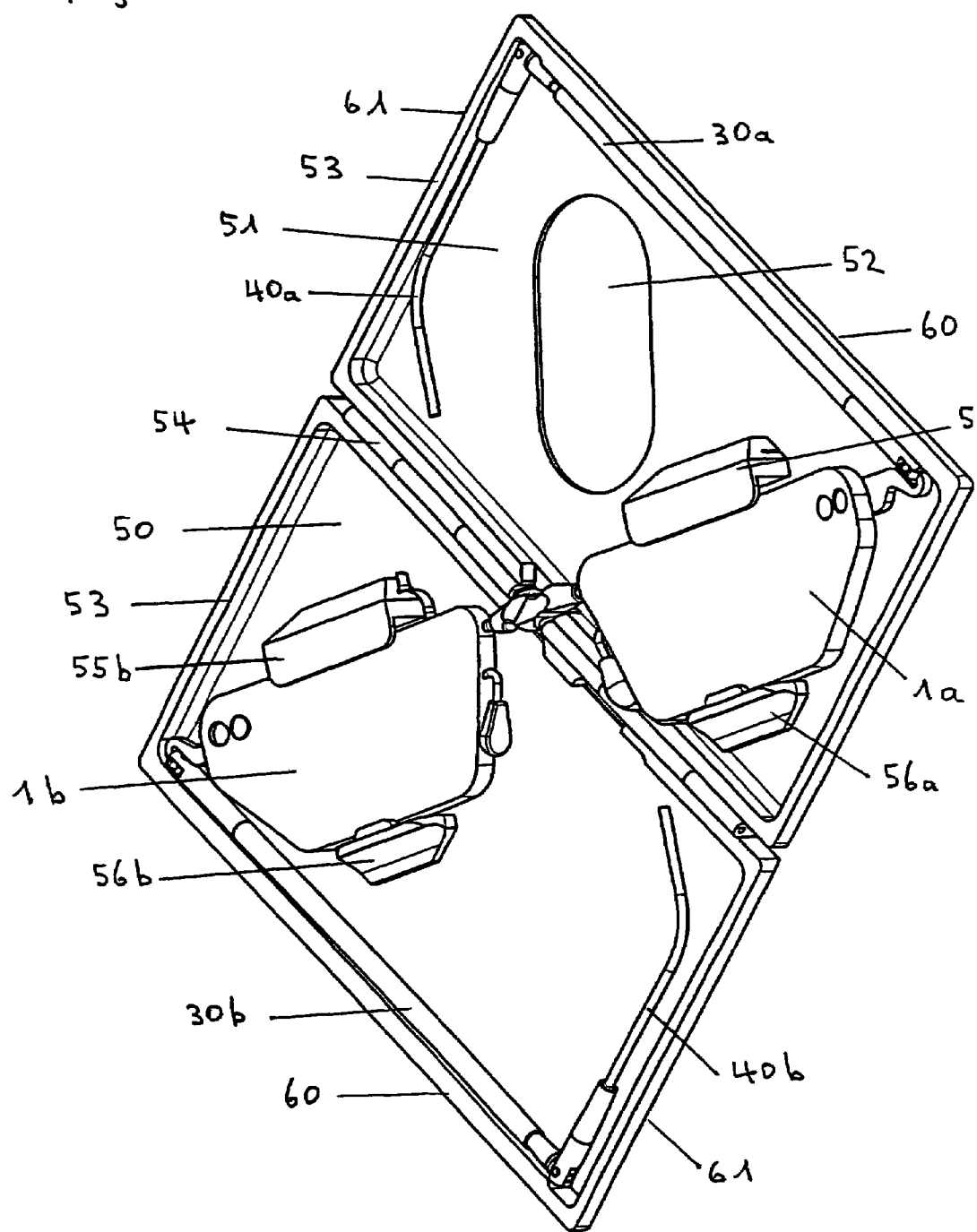
FIG. 9 shows a perspective view of an opened spectacle case with foldable spectacles.
Figure 10:
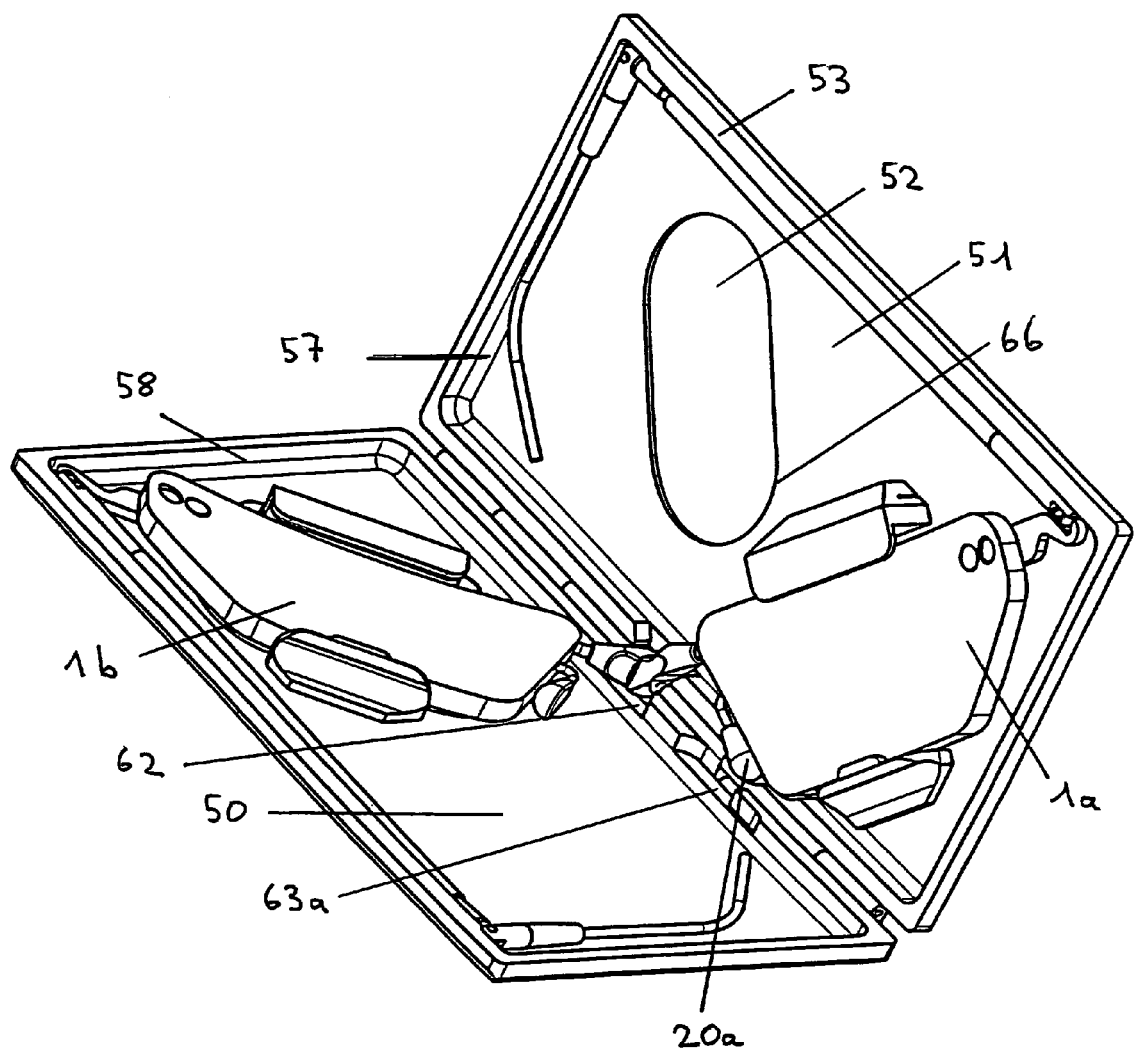
FIG. 10 shows a perspective view of a half-opened spectacle case with foldable spectacles.
Figure 11:
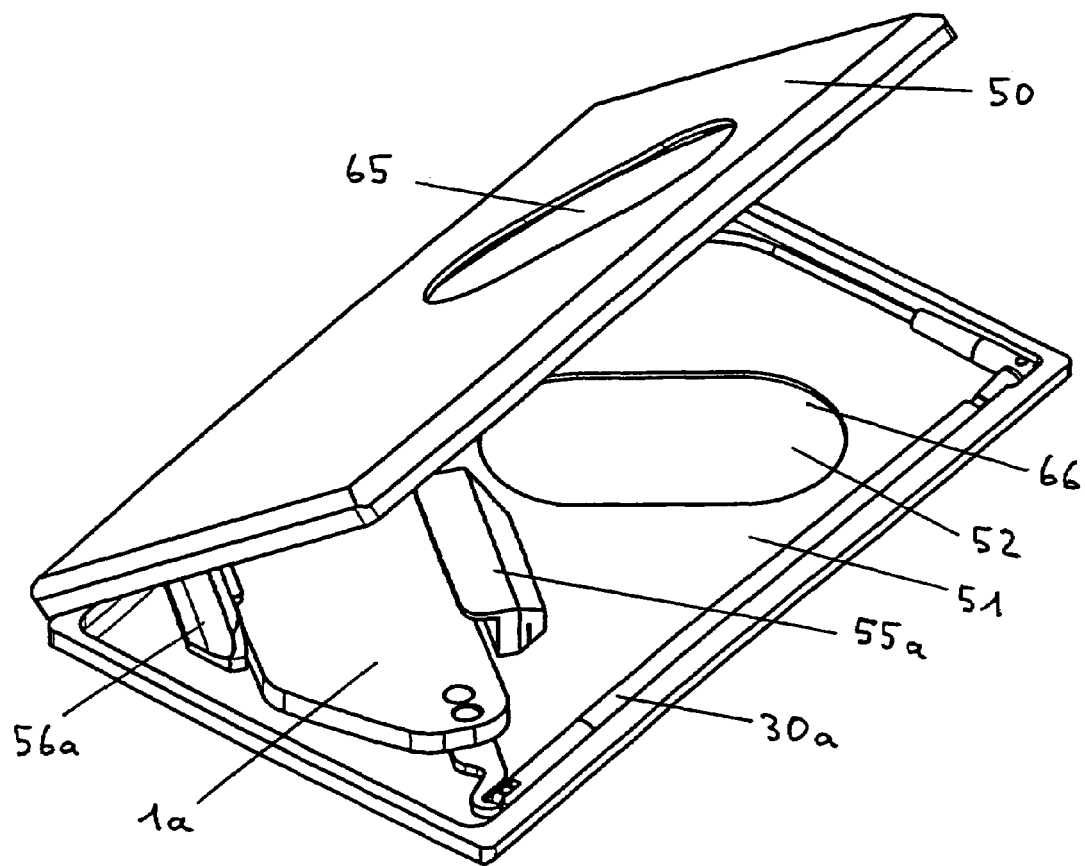
FIG. 11 shows a perspective view of an almost closed spectacle case with foldable spectacles.

FIGS. 9 to 11 show the individual sequences involved in closing a spectacle case or folding the spectacles. In the opened state of the spectacle case, its base 50 and its lid 51 are situated in the same plane. The base 50 and the lid 51 are of rectangular shape and each have two long sides 60 and two short sides 61. The base 50 and the lid 51 are connected to one another by a hinge 54 at one long side 60. The base 50 and the lid 51 each have a peripheral collar 53. This collar 53 has a square or trapezoidal cross section. The base 50 has securing means 55b and 56b for attaching the spectacle lens 1b. The lid 51 also has securing means 55a and 56a for attaching the other spectacle lens 1a. The collars of the base 50 and of the lid 51 at the hinge end have a recess 62 for receiving the folding joint of the foldable spectacles. Those sides of the peripheral collar 53 directed toward the inside of the spectacle case have a hollow edge 57, 58.

FIG. 9 also shows the temple sidepieces and ear sidepieces 30b, 40b, 30a, 40a rotated into the plane of the spectacle lenses 1b, 1a. The temple sidepieces 30a and 30b of the spectacles lie on the long sides 60 of the base 50 and of the lid 51. The ear sidepieces 40a and 40b lie on the short sides 61 of the base 50 and of the lid 51. The spectacle case depicted in FIG. 9 has a magnifying glass 52 on the lid 51. In this way, this spectacle case can also be used as a magnifying glass in the opened or closed state.

On the long side toward the hinge, the peripheral collar 53 has the recess 62 for the folding joint. Also on the side toward the hinge, the peripheral collar has a further recess 63a for partially receiving the pad bridge 20a of the spectacle lens 1a secured on the lid 51. The lid 51 has a recess 66 into which a magnifying glass 52 is fitted. The base 50 shown in FIG. 10 has a peripheral collar 53 with a hollow edge 58 directed toward the interior of the spectacle case. The lid 51 likewise has a peripheral collar 53 whose side directed toward the inner edge of the spectacle case is designed as a hollow edge 57. According to FIG. 11, a recess or window opening 65 is arranged on the opposite base 50 and disposed in mirror symmetry with the opening 66. The opening 65 is located exactly above the spectacle lens 1b, so that, when the foldable spectacles are inserted, the magnifying effect can be intensified. Overall, the spectacle case has a box shape, the thickness of the enclosed interior corresponding approximately to the thickness of a spectacle lens 1a, 1b. However, it should be noted here that the flanges formed on the upper and lower spectacle holders 55a, 55b, 56a, 56b have a certain thickness such that the box-shaped interior overall is somewhat thicker than the thickness of the spectacle lens. The foldable spectacles are expediently always placed in a diagonal in the opened spectacle case. It should be noted here that the folding joint 15 always drops exactly into the hinge-side recess 62 provided for it in the peripheral collar 53.

Figure 12A:
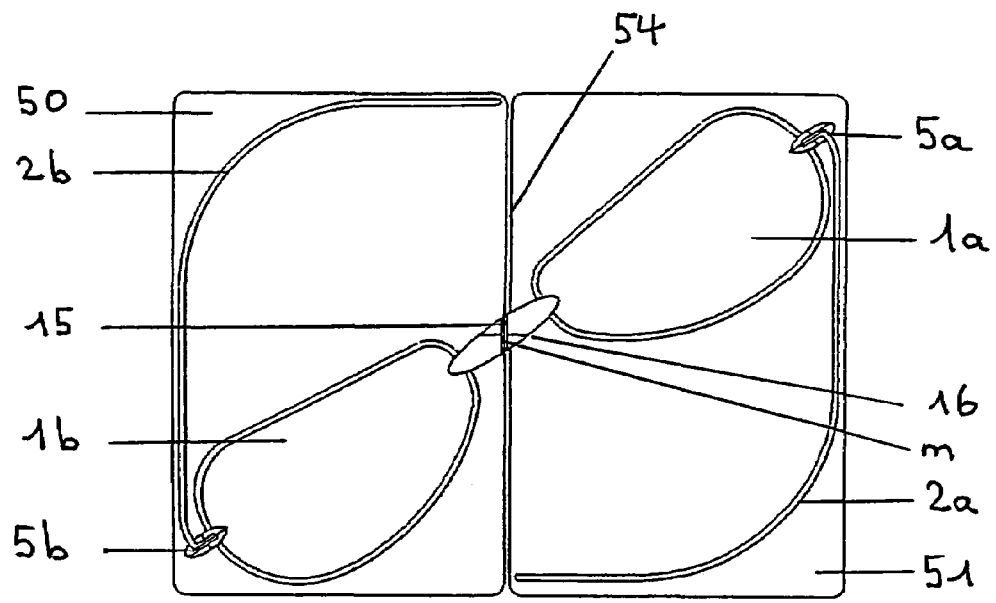
FIG. 12a shows a plan view of an alternative embodiment of the foldable spectacles in the fully opened state.

FIG. 12a shows the plan view of an alternative embodiment of the foldable spectacles in the fully opened state. The foldable spectacles are placed in a spectacle case with hinge 54, the spectacle lens 1a being secured on the lid 51, and the spectacle lens 1b being secured on the base 50. To make the depiction clearer, the corresponding securing means are not shown in FIG. 12. The folding joint 15 forms the nosepiece, i.e. the nose connection of the two spectacle lenses 1a, 1b. The two hinge surfaces 16 bearing on one another lie in a plane perpendicular to the hinge 54 of the case, and the rotation axis m of the folding joint 15 coincides with the axis of the hinge 54. The sidepieces 2a, 2b of the foldable spectacles shown in FIG. 12a are secured on the spectacle lenses 1a, 1b by means of sidepiece hinges 5a, 5b. The sidepieces 2a, 2b themselves are designed in one piece.

Figure 12B:
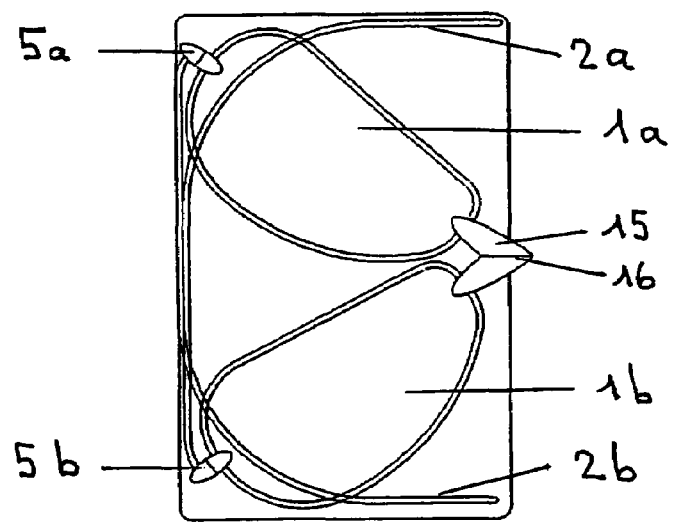
FIG. 12b shows a plan view of the foldable spectacles from FIG. 12a in the closed state.

FIG. 12b shows a plan view of the alternative embodiment from FIG. 12a, but with the foldable spectacles depicted here in the fully closed state. The foldable spectacles are again placed in a spectacle case, only the contours of which can be seen. The spectacle case shown in FIG. 12b can, for example, constitute a housing made of transparent material. FIG. 12b shows the position of the foldable spectacles after the spectacle lens 1a, located on the wearer's right-hand side, has been rotated through 180°, during which the left-hand spectacle lens 1b remained lying on the support surface. FIG. 12b also shows in particular the configuration of the folding joint 15 in the folded state.

The invention claimed is:

1. Foldable spectacles with two spectacle lenses (1a, 1b) which can be adjusted between a wearing position and a folded position and which are connected to one another by a nosepiece (10), which nosepiece (10) lies on a connecting axis (1') extending approximately in the plane of the spectacle lenses (1a, 1b) and comprises a folding joint (15) for folding the spectacles, characterized in that the folding joint (15) can be rotated about a rotation axis (m), extending at an acute angle (β) to the connecting axis (1'), such that the spectacle lenses (1a, 1b), after being rotated through 180°, come to lie in the same plane next to one another in the folded position.

2. The foldable spectacles as claimed in claim 1, characterized in that the folding joint (15) comprises two folding-joint parts (12a, 12b) which each have a hinge surface (16) whose surface normals coincide with the rotation axis (m), the hinge surfaces (16) lying on one another and being connected releasably by a securing means (13).

3. The foldable spectacles as claimed in claim 2, characterized in that the connection between the folding-joint parts is pretensioned with a spring element (14) in the direction of the rotation axis.

4. The foldable spectacles as claimed in claim 1, characterized in that the acute angle (β) between the connecting axis (1') and the rotation axis (m) is between 30° and 60°, in particular between 40° and 50°.

5. The foldable spectacles as claimed in claim 1, characterized in that, at least on one spectacle lens (1a, 1b), a sidepiece (2a, 2b) is secured by means of a sidepiece hinge (5a, 5b) on a sidepiece mount (3a, 3b) fixed on the spectacle lens (1a, 1b), in such a way that the sidepiece (2a, 2b) can be rotated from a wearing position, in which it lies substantially perpendicular to the plane of the spectacle lenses (1a, 1b), into the plane of the adjoining spectacle lens.

6. The foldable spectacles as claimed in claim 5, characterized in that the sidepiece mount (3a, 3b) has a rotary bushing (8a, 8b) at one end, and that end of the sidepiece (2a, 2b) oriented toward the sidepiece hinge has a fork-shaped projection (7a, 7b) with two tabs which are spaced apart and which have bores for receiving a rotary pin (9a, 9b), the rotary bushing (8a, 8b) lying between the two tabs of the fork-shaped projection (7a, 7b).

7. The foldable spectacles as claimed in claim 6, characterized in that the rotary bushing (8a, 8b) is designed as a disk-shaped locking element (21a, 21b) with a peripheral surface (23a, 23b), and the peripheral surface (23a, 23b) has at least two trough-like depressions (22a, 22b) for receiving a resilient catch element (27a, 27b) at the end of the sidepiece (2a, 2b), the trough-like depressions (22a, 22b) being arranged at an angle of approximately 90° relative to the rotation axis extending through the rotary bushing (8a, 8b) and being used to releasably lock the sidepiece (2a, 2b) in the wearing position or in the folded position.

8. The foldable spectacles as claimed in claim 5, characterized in that the sidepiece (2a, 2b) is divided into a temple sidepiece (30a, 30b), bearing on the sidepiece hinge (5a, 5b), and an ear sidepiece (40a, 40b), an intermediate hinge (35a, 35b) being arranged between the temple sidepiece (30a, 30b) and the ear sidepiece (40a, 40b), and the ear sidepiece being able to be pivoted between a deployed position, extending coaxially with respect to the long sidepiece, and an angled position in which it is bent approximately at a right angle with respect to the temple sidepiece.

9. The foldable spectacles as claimed in claim 8, characterized in that the intermediate hinge (35a, 35b) has a catch device for releasably locking the ear sidepiece in the deployed position or angled position.

10. The foldable spectacles as claimed in claim 8, characterized in that the temple sidepiece (30a, 30b) is designed as a telescope, said temple side-piece (30a, 30b) having a hollow space which, at least in an end area directed toward the ear sidepiece (40a, 40b), contains a telescope guide element (48a, 48b) whose inner cross section has a polygonal configuration and receives a telescope insert (31a, 31b) of corresponding polygonal cross section, the telescope insert (31a, 31b) being connected by means of a telescopic spring (33a, 33b) fitted in the cylindrical hollow space of the temple sidepiece (30a, 30b), in such a way that said telescope insert (31a, 31b) is ejected from the hollow space.

11. The foldable spectacles as claimed in claim 10, characterized in that the telescope insert (31a, 31b), along its longitudinal axis, is twisted in cross section in such a way that the telescope insert (31a, 31b) inserted fully into the hollow space of the temple sidepiece (30a, 30b) is rotatable about its longitudinal axis.

12. The foldable spectacles as claimed in claim 5, characterized in that the sidepiece (2a, 2b) is designed as a telescope.

13. A spectacle case for storage of foldable spectacles with two spectacle lenses which can be folded about a folding joint, in particular as claimed in claim 1, the spectacle case comprising two housing parts (50, 51) connected by a hinge (54), characterized) in that the spectacle case has securing means (55a, 55b, 56a, 56b) for releasable attachment of the spectacles, and in that the securing means (55a, 55b, 56a, 56b) are arranged in such a way that, when the spectacles are placed in the case, the hinge axis and the rotation axis (m) of the folding joint (15) coincide.

14. The spectacle case as claimed in claim 13, characterized in that the housing parts (50, 51) of the spectacle case each have a peripheral collar (53), each of these having, at least in some areas, a hollow edge (57, 58) which is open toward the hollow space of the spectacle case and partially receives the sidepieces (2a, 2b).

15. The spectacle case as claimed in claim 13, characterized in that a housing part (50, 51) has an opening (65, 66) into which a magnifying glass (52) is fitted.

16. The spectacle case as claimed in claim 15, characterized in that, when the spectacle case is folded shut, the housing part (50, 51) lying opposite the opening (65, 66) for the magnifying glass has a corresponding window opening (65, 66) arranged in mirror symmetry.

17. An arrangement of foldable spectacles as claimed in claim 1 in a spectacle case, comprising two housing parts (50, 51) connected by a hinge (54), characterized in that the spectacle case has securing means (55a, 55b, 56a, 56b) for releasable attachment of the spectacles, and in that the securing means (55a, 55b, 56a, 56b) are arranged in such a way that, when the spectacles are placed in the case, a hinge axis and the rotation axis (m) of the folding joint (15) coincide, characterized in that the spectacle lenses (1a, 1b) are arranged diagonally in the spectacle case when the spectacle case is fully opened.

18. The arrangement as claimed in claim 17, the spectacles comprising two sidepieces (2a, 2b) which consist of temple sidepiece and ear sidepiece, characterized in that the temple sidepieces (30a, 30b) bear on long sides (60) of the housing parts (50, 51) opposite the hinge (54), and the ear sidepieces (40a, 40b) bear on shorter sides (61) in such a way that the two spectacle lenses (1a, 1b) and the sidepieces (30a, 30b, 40a, 40b) are arranged in a Z shape when the spectacle case is in the fully opened state.

* * * * *